United States Patent [19]

Gillson

[11] Patent Number: 4,655,141

[45] Date of Patent: Apr. 7, 1987

[54] LOAD HANDLING TROLLEY

[75] Inventor: Alan Gillson, Oxenhope Nr. Keighley, England

[73] Assignee: Joloda Loading Systems Limited, Liverpool, England

[21] Appl. No.: 635,841

[22] Filed: Jul. 30, 1984

[30] Foreign Application Priority Data

Jul. 30, 1983 [GB] United Kingdom ................ 8320591
Jun. 16, 1984 [GB] United Kingdom ................ 8415408

[51] Int. Cl.⁴ ............................................. B65G 25/02
[52] U.S. Cl. .................................... 104/307; 104/140; 198/774; 414/525 B
[58] Field of Search ............... 104/140, 139, 162, 135, 104/1 R; 414/525 B; 198/802, 801, 786, 774

[56] References Cited

U.S. PATENT DOCUMENTS

| | | | |
|---|---|---|---|
| 3,091,477 | 5/1963 | Johnstone | 104/135 |
| 3,197,023 | 7/1965 | Achammer | 104/162 |
| 3,420,358 | 1/1969 | Iverson | 198/774 |
| 3,581,880 | 6/1971 | Iverson | 198/774 |
| 3,777,916 | 12/1973 | Lutz | 414/525 B |
| 3,871,534 | 3/1975 | Bursk | 414/525 B |

FOREIGN PATENT DOCUMENTS 952051 3/1964 United Kingdom .
1045362 10/1966 United Kingdom .
0518428 7/1976 U.S.S.R. .......................... 414/525 B

OTHER PUBLICATIONS

Publication "Joloda High Lift Version Skate & Track System", 1977.
Publication "The Joloda Pallet Skate"1985.

Primary Examiner—Robert B. Reeves
Assistant Examiner—Donald T. Hajec
Attorney, Agent, or Firm—Robert H. Ware; Melvin I. Stoltz; Alfred A. Fressola

[57] ABSTRACT

A load handling trolley of the type that normally run in channels tracks comprises an elongate load engager raisable and lowerable relative to at least one bogie assembly via a ramp-and-roller when the engager and the bogie assembly are caused to move longitudinally relative to each other, and a positive retention mechanism positioned between the engager and bogie assembly.

21 Claims, 8 Drawing Figures

LOAD HANDLING TROLLEY

BACKGROUND

The invention relates to load handling trolleys of the type that normally run in channel tracks and comprise elongate load engagers raisable and lowerable relative to bogies via ramp-and-roller means when the engager and the bogies are caused to move longitudinaly relative to each other. The trolleys are conveyed under a load, such as a pallet, in first a lowered state and are then raised to engage and lift the load for further conveyance.

Successful and well-known examples of such trolley-in-track systems are available from the applicants under the Registered Trade Mark JOLODA; and is set forth in U.S. Pat. No. 3,091,477.

A strong reasonably flat floor into which the tracks are laid, and reasonably rigid loads, such as containers or pallets, have led to remarkably lowprofile trolleys in quite shallow tracks as only a small lift height has been adequate to give a free travel clearance for the load over the floor after insertion of and raising the trolley.

There is now a tendency, dictated by seeking minimum costs of floors, pallets and containers, for floors to be less reliably strong and flat and for loads to be less rigid, so that flexing or sagging can result in previously satisfactory lifting heights being insufficient to avoid load-to-floor contact during movement of loads by the trolleys.

It is an object of this invention to provide trolleys with a higher lift height without requiring a deeper track and a higher profile for the trolleys in their unraised state.

The success and reputation of JOLODA trolleys is based on sound and well-engineered design involving, inter alia, close juxtaposition of the bogie side walls and the depending walls of the inverted channel section load engagers, virtually flush bottoms of such walls in the unraised state of the trolleys, and positive retention means between those side and depending walls. We further seek to be able to retain those features, but the limits set by rigid pin-and-ledge, groove or slot type positive retention means preclude achievement of desired amounts of increased lift.

Accordingly, we now propose a positive retention means that is basically characterised by including a device having one component that is anchored to the load engager and at least one other relative movable component connected to the first component and coupled to the bogie assembly so as to move during relative movement of the engager and bogie assembly.

It is evident that, for greater lift within the same basic trolley height, the ramp means must more nearly approach the available height of the space within the inverted channel type load engagers encompassing the bogies, though we prefer that it should remain slightly less so that positive lateral location of the sides of the bogies remain even when approaching and when at full lift height of the trolley. This result is due to overlap by the depending sides of the load engager, which are preferably closely adjacent thereto throughout their length. Lift height will usually be greater on approach if, as is preferred, the ramps have locating depressions at full height.

A particularly robust embodiment has retention means in the form of spring links engaging and effectively in guiding/retaining engagement with rollers or some other cross-connection of the bogies, say encompassing axles or rods thereof in a slot of the links otherwise anchored, say clamped under wedges with which the rollers coact.

SUMMARY OF THE INVENTION

The basic action of preferred embodiments of the invention will thus be a flexing of spring restrainers for roller-axles or cross-connecting rods as the bogies rollers mount ramps of the load engager, though it must be appreciated that internal studs on sides of the bogies might serve equally well. Use of roller axles will often have substantial practical advantage as such cross-connections or internal protrusions from bogie side walls will normally be closest to the ramps and thus most efficient at least with respect to materials, especially as bogie rollers should not be displaced more than other design considerations dictate from ends of the bogies which, of course, are related to ends of the load engager.

It is accepted that our trolleys will inevitably be subjected to extremely rough treatment, even dropped, if not thrown, onto concrete floors, and we take pride in the fact that our trolleys can readily withstand such treatment without failure/breakage.

In that spirit, and for such treatment, we prefer to guard against the possibility that bogies can then be forced out of, "flirted" from, positions corresponding to design maxima, indeed extend beyond side walls of the load engager with deleterious effects if we rely entirely upon spring links to prevent such effects, no matter how closely such links are in guiding relationship with the roller axles/bogie cross-connections/bogie studs. To prevent the bogies from extending beyond the side walls of the load engager, the present invention includes inextensible limiting means for the springs links and/or bogie side walls, say as another spring means operable mainly in tension of solid spring material. Such a suitable latch, as is its main function, can extend from below the load engager ramps to the spring links, say via outspead feet of a generally U-shaped wire device with its bight captive under said ramp.

Further protection is afforded by way of limiting the degree of articulation permitted between successive components of bogie systems, at least to prevent "jackknifing".

Suitable spring links are formed for engagement adjacent each side of bogie side walls by a unitary construction of spring steel, or other suitable material should such become available, in sheet form with a first part to be clamped under ramp parts of the bogie and parts extending to each side of a such ramp part, those extending parts being returned on themselves at a suitable distance from the first part, and, preferably, further returned after a distance corresponding to maximum displacement of their engagers, usually roller axles, in climbing of ramp parts, further preferably then brought back to the first return bend to define a slot corresponding to the aforesaid maximum displacement, and yet further preferably again returned through such first return bend and then, desirably, along the first mentioned extension. A highly convenient way we have found to fully implement same is via a plate or sheet of spring material centrally apertured so that plain ends thereof can be formed to super-position with all of the aforesaid bends made in both of the interconnecting side parts.

BRIEF DESCRIPTION OF THE DRAWINGS

One specific preferred embodiment of the invention will now be described, by way of example, with reference to the accompanying drawings, in which.

BEST MODE FOR CARRYING OUT THE INVENTION

Figure 1:
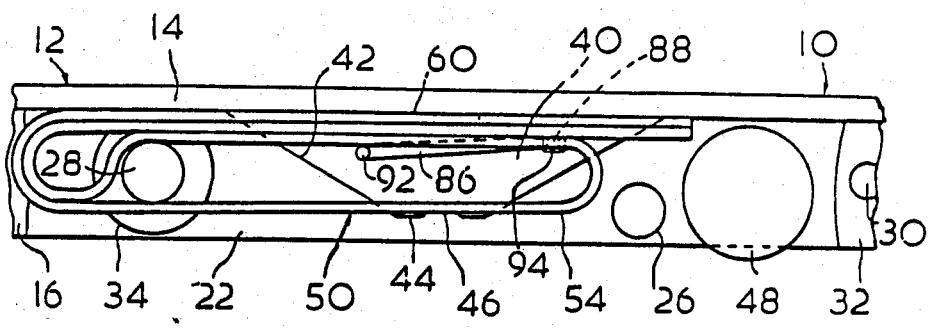
FIG. 1 is an inside fragmental side view of a trolley in its lowered or unraised state.

In the drawings, an elongate trolley 10 has a load engager 12 of inverted channel section so that its web 14 will be upwards to engage a load and its side walls 16, 18 will depend downwardly. Between the side walls 16, 18 and in closely adjacent clearance thereto are bogie assemblies, see 20, having spaced side walls 22, 24 interconnected by studs 26, roller axles 28 and journaled rods 30 for articulation links 32 between bogie assemblies, of which there are normally at least two per load engager, i.e. per trolley or trolley extension unit also available under the JOLODA trade mark.

Roller 34 on axle 28 is, of course, always slightly below the bottom edges of the bogie side walls 22, 24. The load engager 12 has, secured to the underside of its web 14, a ramp block 40, presenting one suitable lifting surface 42 for the roller 34, though actually shown double-sided. That surface 42 leads over a lip or edge 44 to a roller locating depression 46 for the raised state of the trolley 10. Changing between states of the trolley 10 requires relative longitudinal movement of its load engager 12 and bogies 20, actually from left to right for the bogie 20 of FIGS. 1 to 3. Such movement is well-known in the art as set forth in U.S. Pat. No. 3,091,477, corresponding to Applicant's United Kingdom Pat. No. 952,051, the former patent hereby being incorporated by reference.

The bogies 20 also have rollers 48 for movement of the trolleys 10 along tracks (not shown), whether raised to project from the tracks and loaded, or lowered below the track mouth and thus unloaded.

Figure 3:
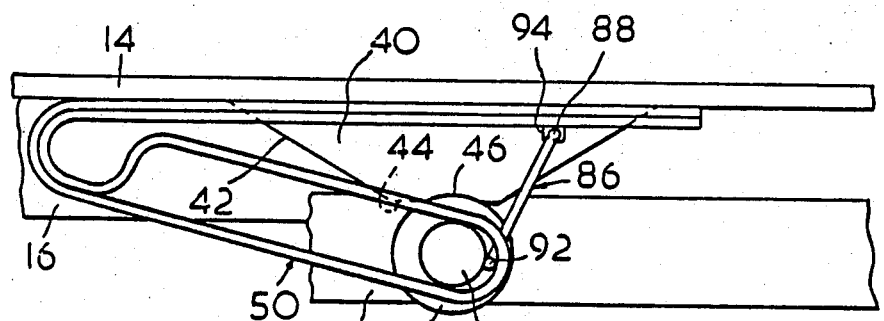
FIG. 3 shows the trolley of FIG. 1 raised.

It is evident from FIG. 3, that there is only a small overlap between the walls 16, 18 and walls 22, 24 when the trolley is in the raised position. Moreover, a still lesser overlap, say as little as 3 mm, will precede that position as the roller 34 goes over the lip or edge 44.

Figure 4A:
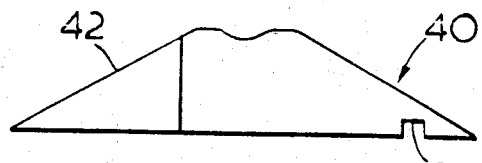
FIGS. 4A and 4B show side and plan views of a preferred ramp part of FIGS. 1 to 3.
Figure 4B:
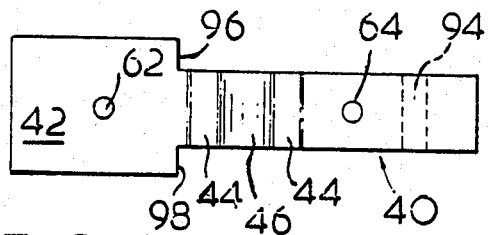
Figure 5:
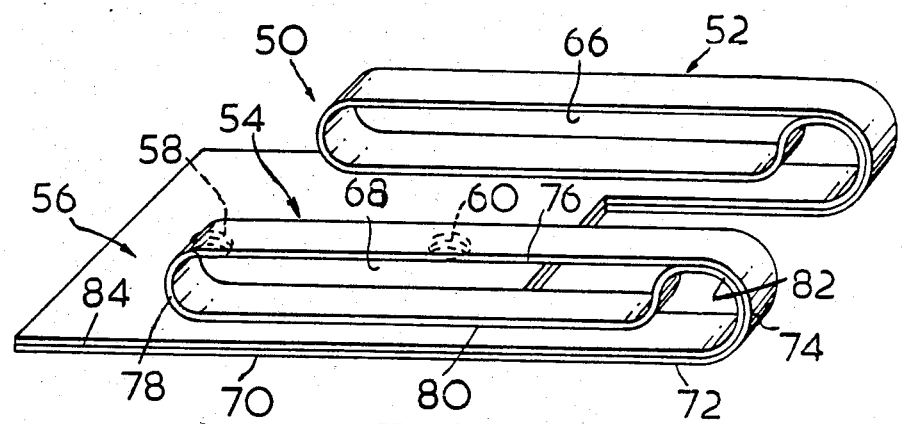
FIG. 5 is a perspective view of a preferred spring link device of FIGS. 1 to 3.
Figure 6:
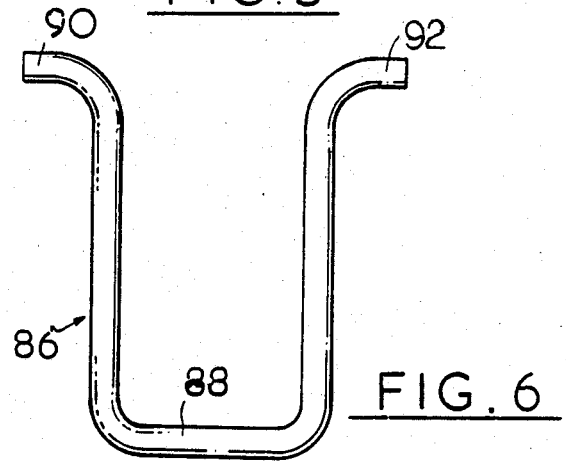
FIG. 6 shows a preferred retainer of FIGS. 1 to 3.

Retention link means for the bogies/load engager arrangement of the trolley is shown at 50 (see also FIGS. 4 to 6 for greater detail). Spring link device 50 has two spaced, parallel sprung arms 52, 54 extending from and turned back over a connecting plate 56 apertured at 58, 60 for clamping securement below the ramp part 40 via bolt holes 62, 60 in the latter. The spring link device 50 has its arms slotted at 66, 68 to closely accommodate roller axle 28.

The device 50 as shown is of centrally apertured spring sheet form with one end part 70 from which arm extensions 72 (one only referenced) extend to a first return blend 74 from which they go back at 76 over the end part 70 to a second return bend 78 towards the end part 70 and extend at 80 below their extension 76 to define slot 66 or 68 whose definition is completed by bringing the part 80 back closely to follow (at 82) the first return bend 74 to a second end part 84 superposed on the first mentioned end part 70.

The spring link device 50 is clamped by its plate part 56 under the ramp part 40 and engages the roller axle 28 in slots 66, 68 as aforesaid. When the roller mounts the ramp part 40 the arms 52, 54 flex from the bends 74, 82 but are under no great strain, so working life will be good, i.e. with low tendency to break at the bends 74, 82 even over a long working life.

The extent of such arms flexing is shown limited by a spring wire clip or retainer 86 of generally U-shape with a bight portion 88 and splayed ends 90, 92. The bight portion is captive in a clearance slot 94 of the underside of the ramp part 40, so that the retainer can swing, and its splayed ends 90, 92 are captive in the slots 66, 68 of the spring arms 52, 54. The sides of ramp part 40 are cut back at 96, 98 to accommodate the retainer 86.

Figure 2:
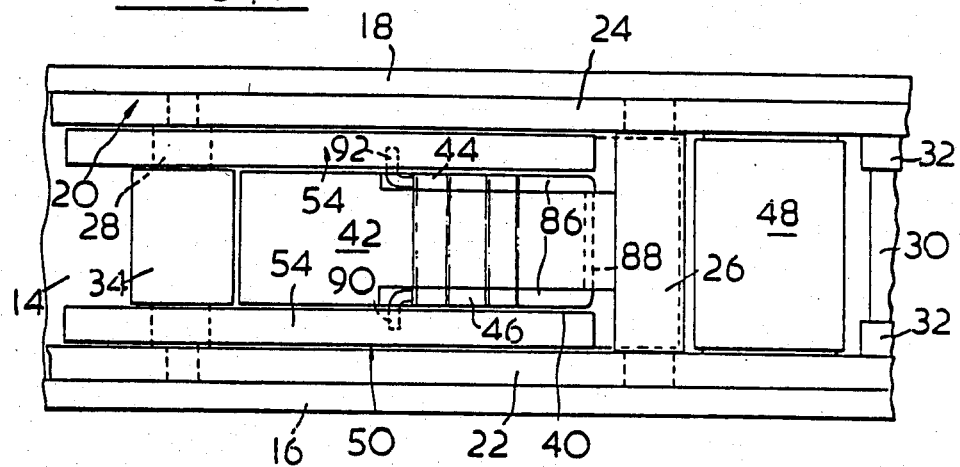
FIG. 2 is a corresponding bottom plan view.

In use, as the trolley is raised from the position of FIG. 1, the bogie 20 moves relative to the load engager 12 from left to right in a manner described in U.S. Pat. No. 3,091,477, the sprung arms 52, 54 flex and the retainer 86 swings in the slot 94 until the roller 34 goes over into the groove 46. During this time, the roller axle 28, and the ends 90, 92 of the retainer, traverse the slots 66, 68 in the spring arms, which slots are of adequate extent to accommodate maximum required movement.

Figure 7:
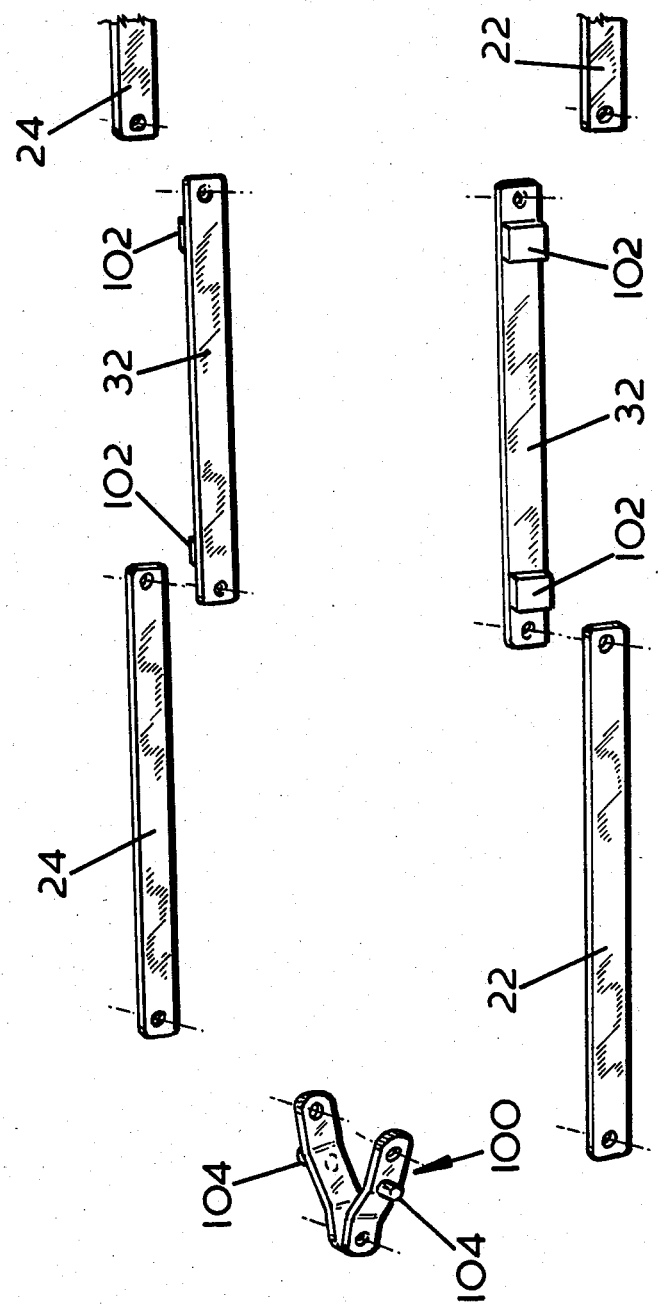
FIG. 7 is an exploded outline view of bogie assembly parts to which articulation limiting is applied.

There are circumstances attaching to very rough usage of trolleys hereof when the retention link means 50 can suffer damage due to over-articulation at the ends of the side walls 22, 24, i.e. where they connect to links 32 and/or to actuator linkages. That is readily overcome by ensuring that trolleys fitted with the units 50 hereof are subject to limitation of permitted articulation at such positions. One way to do so is to have abutments between ends of the side walls 22, 24 and parts journaled thereto, i.e. links 32 and actuator link 100 (see FIG. 7 for welded-on blocks 102 and projecting pins 104). Articulation restriction can be to ±10° or less, preferably in a range of about 9°±2° upwardly into the trolley and about 5°±2° downwardly out of the trolley, though the major factor is simply not to allow undue stressing of the retention links means 50, effectively preventing "jack-knifing".

I claim:

1. A load handling trolley for running in channel tracks comprising at least one bogie assembly, an elongate load engager raisable and lowerable relative to said at least one bogie assembly, ramp-and-roller means which are cooperable to effect said raisable and lowerable movement of said engager relative to said bogie assembly, and positive retention means between said engager and bogie assembly, wherein the positive retention means comprises a device having a first component that is anchored to one of said engager and bogie assembly and at least one other relatively movable component connected to said first component, said movable component having a portion coupled to the other one of said engager and bogie assembly so as to move during relative movement of the engager and bogie assembly.

2. A trolley according to claim 1 comprising means for limiting articulation between successive components of the bogie assemblies.

3. A trolley according to claim 1, wherein each moveable component of the positive retention means is in the form of a spring link, said spring link comprising at least one engager slot which extends from said first component which is anchored, the engager slot being in cooperating engagement with the bogie assembly.

4. A trolley according to claim 3, wherein a ramp part of said ramp and roller means clamps said first component, and roller of said ramp and roller means coacts with said ramp part.

5. A trolley according to claim 4, further comprising inextensible limiting means for at least one of the spring link and bogie assemblies, the limiting means serving to limit flexure of the spring link.

6. A trolley according to claim 5, wherein the limiting means comprises spring means operable mainly in tension of solid spring material.

7. A trolley according to claim 6, wherein the spring link is formed for engagement adjacent each side of bogie assembly side walls by a unitary construction of suitable resilient and flexible material in sheet form with a first part of said first component being clamped under said engager and forward of said ramp parts and parts of said movable component extending to each side of the ramp part, the extending parts being returned to form slots.

8. A trolley according to claim 6, wherein the spring link is formed for engagement adjacent each side of bogie assembly side walls by a unitary construction of suitable resilient and flexible material in sheet form with a first part of said first component being clamped under said engager forward of said ramp part and parts of said movable component extending to each side of such ramp part, those extending parts being returned to form slots.

9. A trolley according to claim 8, wherein those returned extending parts are then brought back to a first return bend after defining said slot returned through the first return bend.

10. A trolley according to claim 8 comprising means for limiting articulation between successive components of the bogie assemblies.

11. A trolley according to claim 8, wherein the slots engagers encompass roller-axles in the bogie assemblies.

12. A trolley according to claim 11, wherein those returned extending parts are brought back to a first return bend after defining said slot and then returned through such first return bend.

13. A trolley according to claim 12, wherein the spring link is formed via a sheet of spring material, said material being centrally apertured and having plain ends and interconnecting side parts, said plain ends thereof being formed to superpose with all of the aforesaid bends made in both of said interconnecting side parts.

14. A trolley according to claim 13, comprising means for limiting articulation between successive components of the bogie assemblies.

15. A trolley according to claim 14, and composing further links journaled to said side walls, and comprising side walls of bogies flanking said ramp-and-roller means and wherein the articulation limiting means includes abutments on said further links.

16. A trolley according to claim 14, comprising side walls of bogies flanking said ramp-and-roller means and actuator link means, wherein the articulation limiting means includes abutments on said actuator link means journaled to side walls of bogies flanking said ramp-and-roller means.

17. A trolley according to claim 3, further comprising inextensible limiting means for at least one of the spring link and bogie assemblies, the limiting means serving to limit flexure of the spring link.

18. A trolley according to claim 3, further comprising inextensible limiting means for at least one of the spring link and bogie assemblies, the limiting means serving to limit flexure of the spring link.

19. A trolley according to claim 3, wherein the spring link is formed for engagement adjacent each side of bogie assembly side walls by a unitary construction of suitable resilient and flexible material in sheet form with a first part of said first component being, clamped under said bogie and adjacent said ramp parts and parts of said movable component, extending to each side of a ramp part, the extending parts being returned to form slots.

20. A trolley according to claim 3, comprising an axle means cooperating with the engager slot of the spring link.

21. A trolley according to claim 20, wherein the axle means comprises a bogie roller axle.

* * * * *